(12) United States Patent
Hamamoto et al.

(10) Patent No.: US 12,111,035 B2
(45) Date of Patent: Oct. 8, 2024

(54) VEHICLE LIGHTING FIXTURE

(71) Applicant: Ichikoh Industries, Ltd., Isehara (JP)

(72) Inventors: Takanori Hamamoto, Isehara (JP); Yuichiro Washi, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 17/904,772

(22) PCT Filed: Feb. 17, 2021

(86) PCT No.: PCT/JP2021/005945
§ 371 (c)(1),
(2) Date: Aug. 22, 2022

(87) PCT Pub. No.: WO2021/172134
PCT Pub. Date: Sep. 2, 2021

(65) Prior Publication Data
US 2023/0041578 A1 Feb. 9, 2023

(30) Foreign Application Priority Data

Feb. 28, 2020 (JP) ................................. 2020-033768

(51) Int. Cl.
*F21S 43/50* (2018.01)
*B60Q 1/38* (2006.01)
(Continued)

(52) U.S. Cl.
CPC .............. *F21S 43/50* (2018.01); *B60Q 1/381* (2022.05); *F21S 43/19* (2018.01);
(Continued)

(58) Field of Classification Search
CPC .......... B60Q 1/38–387; B60Q 2400/50; B60Q 2900/40; F21S 43/14–27; F21S 43/50;
(Continued)

(56) References Cited

U.S. PATENT DOCUMENTS 2,023,845 A 12/1935 Larose
10,794,559 B2 * 10/2020 Masuda ................. F21S 41/43
(Continued)

FOREIGN PATENT DOCUMENTS

DE 10 2015 223 448 A1 6/2017
DE 10 2016 211 653 A1 12/2017
(Continued)

OTHER PUBLICATIONS

International Search Report mailed on Apr. 20, 2021 in PCT/JP2021/005945 filed on Feb. 17, 2021 (3 pages).
(Continued)

*Primary Examiner* — Jason M Han
(74) *Attorney, Agent, or Firm* — Oblon, McClelland, Maier & Neustadt, L.L.P.

(57) ABSTRACT

To provide a vehicular lamp that can improve the degree of freedom in the arrangement position of a road surface irradiation unit. The vehicular lamp comprises a road surface irradiation unit for forming an irradiation pattern around the vehicle with light from a light emitting portion for a road surface; and a shielding part for covering the light emitting portion for the road surface when the road surface irradiation unit is viewed from the front. The vehicular lamp may further comprise a lamp unit housed in a lamp chamber together with the road surface irradiation unit, and the road surface irradiation unit may be turned on and off interlocked with the lamp unit.

10 Claims, 6 Drawing Sheets

(51) Int. Cl.
*F21S 43/19* (2018.01)
*F21W 103/20* (2018.01)
*F21W 103/60* (2018.01)
*F21W 107/10* (2018.01)

(52) U.S. Cl.
CPC ...... *B60Q 2400/50* (2013.01); *B60Q 2900/40* (2022.05); *F21W 2103/20* (2018.01); *F21W 2103/60* (2018.01); *F21W 2107/10* (2018.01)

(58) Field of Classification Search
CPC ........... F21W 2103/20; F21W 2103/60; F21W 2107/10
See application file for complete search history.

(56) References Cited

U.S. PATENT DOCUMENTS

| | | |
|---|---|---|
| 2003/0174505 A1 | 9/2003 | Wainwright |
| 2013/0010484 A1 | 1/2013 | Son et al. |
| 2017/0166111 A1 | 6/2017 | Baccarin et al. |
| 2018/0236929 A1 | 8/2018 | Gocke et al. |
| 2019/0322209 A1* | 10/2019 | Sugiyama ............... F21S 41/43 |

FOREIGN PATENT DOCUMENTS

| | | |
|---|---|---|
| JP | 2014-144725 A | 8/2014 |
| JP | 2016-193689 A | 11/2016 |
| JP | 2019-6366 A | 1/2019 |

OTHER PUBLICATIONS

Japanese office action dated Sep. 5, 2023 issued in corresponding Japanese Patent Application No. 2020-033768, 10 pages.
Extended European Search Report, dated Feb. 19, 2024, issued in corresponding European Application No. 21761329.8, 11 pages.
Japanese office action, dated Mar. 5, 2024 issued in corresponding Japanese Patent Application No. 2020-033768, 9 pages.

* cited by examiner

VEHICLE LIGHTING FIXTURE

TECHNICAL FIELD

The present disclosure relates to a vehicular lamp.

BACKGROUND ART

A vehicular lamp is considered to form an irradiation pattern on a road surface around a vehicle (see, e.g., Patent Literature 1). In this vehicular lamp, a display pattern projection part as a road surface irradiation unit with a light source and a projection lens is provided in a lamp chamber, and light emitted from the light source is projected by the projection lens to form an irradiation pattern in a position visible to occupants of the vehicle and surrounding persons.

CITATION LIST

Patent Literature

Patent Literature 1: Japanese Unexamined Patent Application Publication No. 2014-144725

SUMMARY OF THE INVENTION

Problems to be Solved by the Invention

However, since this vehicular lamp projects light from the projection lens of the road surface irradiation unit to form an irradiation pattern, the projection lens appears to glow during projection and becomes the light emitting portion for the road surface in the road surface irradiation unit. In addition to the road surface irradiation unit, the vehicular lamp also has other lamp units in the lamp chamber, and the lamp light emitting portions of these lamp units will also appear to glow. Here, the arrangement position of the road surface irradiation unit is restricted because of the positional relationship rules between the light emitting portion for the road surface and the lamp light emitting portion when the vehicular lamp is viewed from the front.

The purpose of this disclosure is to provide a vehicular lamp that can improve the degree of freedom in the arrangement position of the road surface irradiation unit in view of the above circumstances.

Means for Solving the Problem

The vehicular lamp of the present disclosure comprises a road surface irradiation unit for forming an irradiation pattern around the vehicle with light from a light emitting portion for a road surface; and a shielding part for covering the light emitting portion for the road surface when the road surface irradiation unit is viewed from the front.

Effect of the Invention

According to the vehicular lamp of the present disclosure, the degree of freedom in the arrangement position of the road surface irradiation unit can be improved.

MODE FOR CARRYING OUT THE INVENTION

Figure 1:
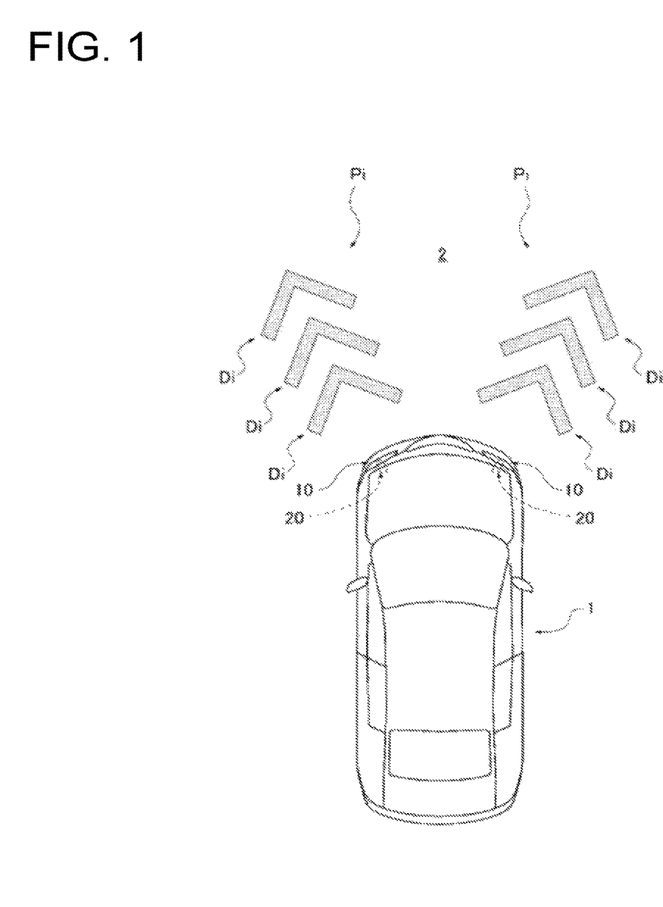
FIG. 1 is an explanatory diagram illustrating a state where a vehicular lamp according to a first embodiment of the present disclosure is mounted on a vehicle to form an irradiation pattern.

Embodiments of a vehicular lamp 10, which is an example of a vehicular lamp according to the present disclosure, will be described below with reference to the drawings. Further, in order to facilitate understanding of the state where a road surface irradiation unit 20 is provided in the vehicular lamp 10, FIG. 1 illustrates the road surface irradiation unit 20 in relation to the vehicle 1, with emphasis on the road surface irradiation unit 20, which does not necessarily correspond to the actual state.

First Embodiment

The vehicular lamp 10 according to a first embodiment, which is an embodiment of a vehicular lamp according to the present disclosure, will be described using FIGS. 1 to 7. As illustrated in FIG. 1, the vehicular lamp 10 of the first embodiment is used as a lamp for a vehicle 1, such as an automobile, and has functions of a headlamp, a turn lamp, etc. and also has a function of forming an irradiation pattern Pi on a road surface 2 in a front surrounding area of the vehicle 1. The front surrounding area of the vehicle 1 includes a proximity area that is closer to the vehicle 1 than a headlamp area irradiated by the headlamp provided in the vehicle 1 and may partially include the headlamp area.

Figure 2:
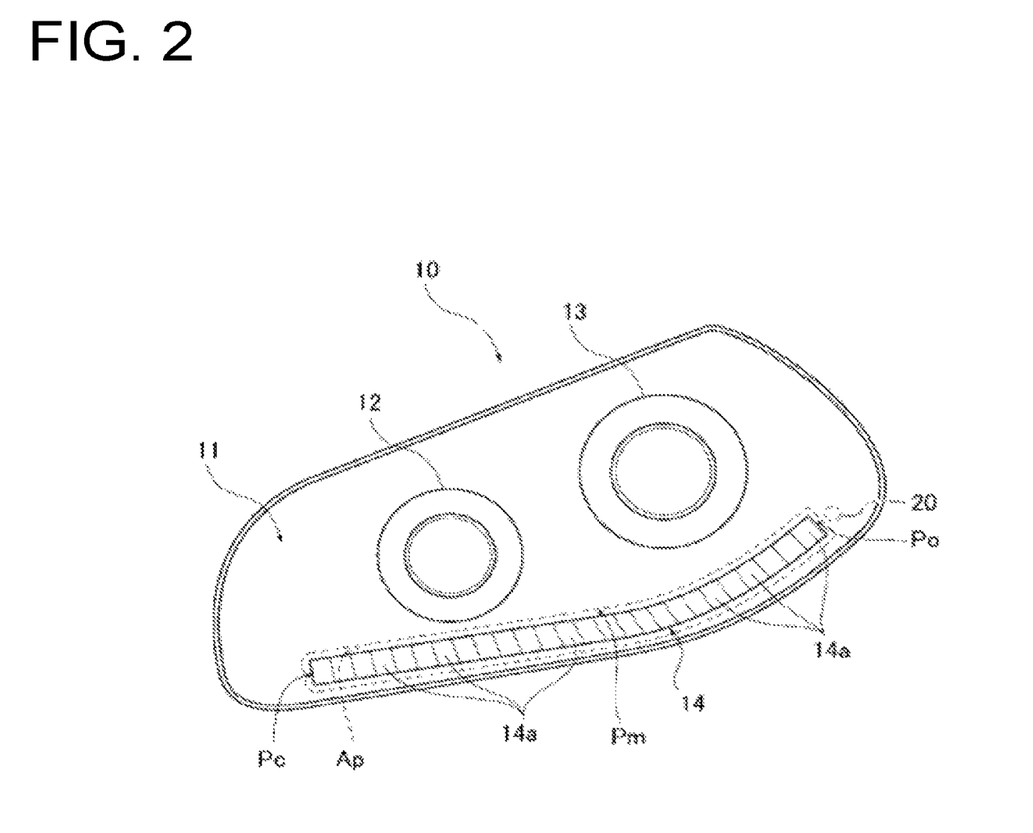
FIG. 2 is an explanatory diagram illustrating the vehicular lamp as seen from a travel direction, together with an arrangement area that is formed at a predetermined interval from a interlocking turn lamp unit.

The vehicular lamp 10 is located on both the left and right sides of the front of the vehicle 1 and, as illustrated in FIG. 2, has a lamp chamber 11 that is formed such that an open front end of a lamp housing is covered by an outer lens. The vehicular lamp 10 of the first embodiment is provided with, as lamp units, a low beam unit 12, a high beam unit 13, a turn lamp unit 14, and a road surface irradiation unit 20 (see FIGS. 1 to 3, etc.) in the lamp chamber 11.

The low beam unit 12 can form light distribution for passing each other with a cut-off line, and can be turned on alone to provide light distribution when passing each other (so-called low beam). The high beam unit 13 can form light distribution for driving above the light distribution for passing each other while overlapping with a part of the light distribution for passing each other, and can be turned on simultaneously with the low beam unit 12 to provide light distribution for driving (so-called high beam). The turn lamp unit 14 is used when the vehicle 1 turns left or right, and the turn lamp units 14 of the left and right vehicular lamps 10 function as hazard lamps when turned on simultaneously. The turn lamp unit 14 in the first embodiment is a sequential lamp with a plurality of lighting parts 14a arranged in a vehicle width direction. When the turn lamp unit 14 is turned on, the lighting parts 14a are turned on in order from inside to outside of the vehicle 1. Therefore, each lighting part 14a is a lamp light emitting portion in the turn lamp unit 14 as a lamp unit.

The road surface irradiation unit 20 forms an irradiation pattern Pi on the road surface 2 in the front surrounding area of the vehicle 1. The road surface irradiation unit 20 is provided in the lamp chamber 11 with a projection optical axis Lp (see FIG. 3, etc.) inclined relative to the road surface 2. In the following description, in the road surface irradiation unit 20, a direction in which the projection optical axis Lp extends, which is the direction to irradiate the light, is referred to as an optical axis direction (Z in the drawing), a vertical direction seen when the optical axis direction extends along a horizontal plane is referred to as an upper-lower direction (Y in the drawing), and a direction (horizontal direction) orthogonal to the optical axis direction and the upper-lower direction is referred to as a width direction (X in the drawing) (see FIG. 3, etc.). The road surface irradiation unit 20 of the first embodiment is provided on the outside of the vehicle 1 (on the right side viewed from the front in FIG. 2) rather than each lighting part 14a of the turn lamp unit 14, in the vehicle width direction.

Figure 3:
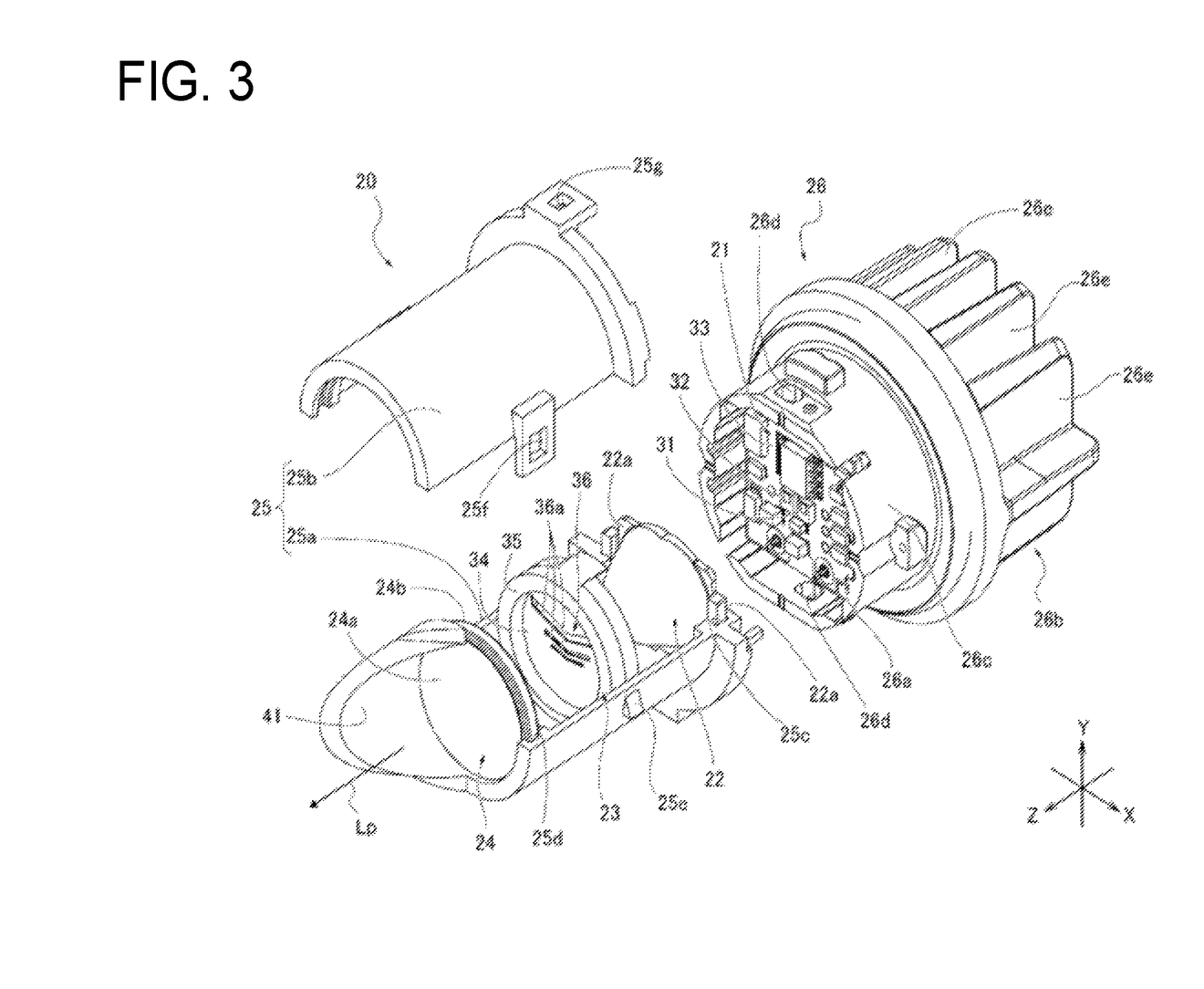
FIG. 3 is an explanatory diagram illustrating a configuration of a road surface irradiation unit in the vehicular lamp of a first embodiment.

As illustrated in FIG. 3, in the road surface irradiation unit 20, a light source part 21, a condenser lens 22, a filter 23, and a projection lens 24 are housed in an enclosure 25 to form a single projection optical system, constituting a projector-type road surface projection unit. The enclosure 25 includes semi-cylindrical lower and upper members 25a and 25b. With each of the above members (22 to 24) installed in the lower member 25a, the lower member 25a and the upper member 25b are fitted together via an installation base part 26. In the enclosure 25, a condenser lens groove 25c to fit the condenser lens 22 therein, a filter groove (not illustrated) to fit the filter 23 therein, and a projection lens groove 25d to fit the projection lens 24 therein are provided (only the lower member 25a side is illustrated). In addition, in the enclosure 25, the lower member 25a is provided with a pair of fixing protrusions 25e in the width direction, and the upper member 25b is provided with a pair of fixing holes 25f in the width direction (only the front side is illustrated in FIG. 3), and each fixing protrusion 25e and each fixing hole 25f can be fitted together. Furthermore, the enclosure 25 has a pair of connecting protrusions 25g (only the upper side is illustrated) in the upper-lower direction. The enclosure 25 in the first embodiment has a shielding part 41 at a tip (the end of the front side in the optical axis direction). This shielding part 41 will be described below. The shape of the enclosure 25 may be appropriately set, and is not limited to the configuration of the first embodiment.

The installation base part 26 installs the light source part 21, is formed of die-cast aluminum or resin having thermal conductivity, and has an installation portion 26a and a heat dissipation portion 26b. The installation portion 26a is a portion where the light source part 21 (substrate 33 thereof) is installed, and is a flat plate orthogonal to the optical axis direction. The installation portion 26a is provided with a connecting wall 26c that surrounds the light source part 21. The connecting wall 26c is provided with a pair of connecting holes 26d in the upper-lower direction, and is connected to the enclosure 25 by inserting each connecting protrusion 25g of the enclosure 25, in which the lower member 25a and the upper member 25b are fitted together, into the corresponding connecting hole 26d. The heat dissipation portion 26b functions as a heat sink to dissipate heat generated by the light source part 21 to outside. This heat dissipation portion 26b is provided continuously to the installation portion 26a and has a plurality of heat dissipation fins 26e. The heat dissipation portion 26b radiates the heat generated by the light source part 21 installed at the installation portion 26a from each of the heat dissipation fins 26e to the outside.

The light source part 21 has a first light source 31, a second light source 32, and a substrate 33 on which the first light source 31 and the second light source 32 are mounted. The first light source 31 and the second light source 32 each include a light emitting element, such as a light emitting diode (LED). In the first embodiment, the first light source 31 and the second light source 32 emit amber-colored light with a Lambertian distribution having the emission optical axis Li as a center. The amber-colored light is the light that is substantially close to monochromatic light in amber having the largest peak in a wavelength band of the amber in a graph having the light quantity as the vertical axis and the wavelength as the horizontal axis. Further, the first light source 31 and the second light source 32 may be set to any color (wavelength band), distribution mode, number of colors (number of peaks in the above graph), etc., as appropriate, may emit light of other colors or white light, and are not limited to the configuration of the first embodiment.

The substrate 33 provided with a lighting control circuit is attached to the installation portion 26a of the installation base part 26, and the first light source 31 and the second light source 32 are mounted on the substrate 33. The substrate 33 supplies electric power from the lighting control circuit as appropriate to turn on the first light source 31 and the second light source 32. When the substrate 33 is attached to the installation portion 26a of the installation base part 26 and the enclosure 25 is connected to the connecting wall 26c, the substrate 33 is positioned at the rear end of the enclosure 25 (the end on the side opposite to the projection lens groove 25d in the optical axis direction), and is placed opposite to the condenser lens 22 (its incidence surface) housed in the enclosure 25.

The condenser lens 22 condenses the light emitted from the first light source 31 and the second light source 32 onto the filter 23. In the first embodiment, the condenser lens 22 is basically a biconvex lens, and the incidence surface and the emission surface are each a free curved face. In the condenser lens 22, flange parts 22a are provided at both ends in the width direction. Each of the flange parts 22a can be fitted into the condenser lens groove 25c of the enclosure 25. When the flange parts 22a are fitted into the condenser lens groove 25c, the lens axis of the condenser lens 22 is caused to coincide with the projection optical axis Lp.

The filter 23 is an example of a light shielding member that forms the irradiation pattern Pi by partially transmitting the light from the first light source 31 and the second light source 32 condensed by the condenser lens 22. As illustrated in FIG. 1, the irradiation pattern Pi has three irradiation drawing patterns Di in the diagonal front of the vehicle 1, which are aligned in a direction away from the vehicle 1. Each irradiation drawing pattern Di has a large open V-shape and is of a substantially equal size each other. The irradiation pattern Pi can look like an arrow pointing in a predetermined direction from the vehicle 1 by arranging each of the three irradiation drawing patterns Di with the vertices of the V-shaped pattern positioned in a substantially straight line. The irradiation pattern Pi consisting of these three irradiation drawing patterns Di is formed by the filter 23. The filter 23 is of equal configuration regardless of whether it is provided on the left or right side of the vehicle 1.

In the filter 23, as illustrated in FIG. 3, a filter part 34 is provided in a filter frame part 35. The filter frame part 35 is a circular frame that surrounds the filter part 34 and can be fitted into the filter hole (not illustrated) of the enclosure 25.

The filter part 34 is basically formed of a plate-shaped member that blocks the transmission of light, and is provided with an irradiation slit 36 through the member. The irradiation slit 36 partially transmits the light from the first light source 31 and the second light source 32 condensed by the condenser lens 22 thereby to form the irradiation pattern Pi into a predetermined shape. The irradiation slit 36 is caused to correspond to the irradiation pattern Pi, and, in the first embodiment, comprises three slit parts 36*a*. The three slit parts 36*a* correspond, one-to-one, to the three irradiation drawing patterns Di, and are each made in the form of a large open V-shape similar to each irradiation drawing pattern Di. The size and interval of each of the three slit parts 36*a* are set according to the distance to the road surface 2 so that each irradiation drawing pattern Di has substantially equal size and substantially equal interval on the road surface 2.

In addition, each slit part 36*a* is in a positional relation rotational symmetrical around the projection optical axis Lp, relative to the positional relation of each irradiation drawing pattern Di of the irradiation pattern Pi. In other words, the road surface irradiation unit 20 is provided with each slit part 36*a* in a manner that each irradiation drawing pattern Di is in a targeted positional relation on the road surface 2, by taking into consideration that the projection lens 24 inverts and projects the filter 23 (irradiation slit 36) to the road surface 2.

The projection lens 24 has a lens body part 24*a*, which is a circular convex lens when viewed in the optical axis direction, and a flange part 24*b* surrounding a periphery of the lens body part 24*a*. In the first embodiment, the incidence surface and the emission surface of the lens body part 24*a* are formed into free curved faces that are convex surfaces. The lens body part 24*a* projects the light transmitted through the irradiation slit 36 of the filter 23 (each slit part 36*a* thereof) to form the irradiation pattern Pi on the road surface 2 inclined with respect to the projection optical axis Lp, as illustrated in FIG. 1. The incidence surface and the emission surface may be convex surface or concave surface, and are not limited to the configuration of the first embodiment, as long as the lens body part 24*a* is a convex lens.

The flange part 24*b* protrudes from the lens body part 24*a* in a radial direction with the lens axis as a center, and extends around the entire circumference in a circumferential direction with the lens axis as a center. The flange part 24*b* is capable of being fitted into the projection lens groove 25*d* of the enclosure 25. When the flange part 24*b* is fitted into the projection lens groove 25*d*, the lens axis of the projection lens 24 is caused to coincide with the projection optical axis Lp.

The road surface irradiation unit 20 is assembled as follows. First, the light source part 21 is assembled by mounting the first light source 31 and the second light source 32 on the substrate 33, and the installation base part 26 is constituted by fixing the light source part 21 to the installation portion 26*a*. Then, in the lower member 25*a* of the enclosure 25, the condenser lens 22 is fitted into the condenser lens groove 25*c*, the filter 23 is fitted into the filter hole (not illustrated), and the projection lens 24 is fitted into the projection lens groove 25*d*. Then, the enclosure 25 is formed by fitting the upper member 25*b* to the lower member 25*a*, and the enclosure 25 is connected to the installation base part 26 via the connecting wall 26*c* by inserting each connecting protrusion 25*g* of the enclosure 25 into the corresponding connecting hole 26*d*. As a result, the condenser lens 22, the filter 23, and the projection lens 24 are housed in the enclosure 25 and the light source part 21 is connected to the enclosure 25. Consequently, the condenser lens 22, the filter 23 and the projection lens 24 are arranged on the projection optical axis Lp in the above order from the light source part 21 side in a predetermined positional relation thereby to assemble the road surface irradiation unit 20.

The road surface irradiation unit 20 is provided at any position in the lamp chamber 11 in a state in which the projection optical axis Lp is inclined relative to the road surface 2 around the vehicle 1 while being directed to diagonal front side outside the vehicle 1. The road surface irradiation unit 20 can appropriately turn on and off the both light sources (31, 32) by supplying electric power from the lighting control circuit to the both light sources (31, 32) from the substrate 33. The light from the both light sources (31, 32) is condensed by the condenser lens 22 thereby to irradiate the filter 23, and after transmitting through the irradiation slit 36 (each slit part 36*a*) thereof, is projected by the projection lens 24 thereby to form the irradiation pattern Pi on the road surface 2. The irradiation pattern Pi is formed by three irradiation drawing patterns Di aligned nearly on a straight line. In particular, in the road surface irradiation unit 20 of the first embodiment, the both light sources (31, 32) are monochromatic light sources, and therefore the influence of chromatic aberration in the projection lens 24 can be greatly suppressed, and the irradiation pattern Pi, i.e., each irradiation drawing pattern Di, can be made clear.

In this way, the road surface irradiation unit 20 emits the light emitted from the both light sources (31, 32) through the condenser lenses 22 and the filter 23, and finally through the projection lens 24 to form the irradiation pattern Pi. Therefore, in the road surface irradiation unit 20, the projection lens 24 becomes the light emitting portion for the road surface that appears to glow when light is emitted.

Next, the configuration of the shielding part 41 will be described using FIGS. 3 through 7. The shielding part 41 makes the projection lens 24, which is the light emitting portion for the road surface in the road surface irradiation unit 20, invisible when viewed from the front, i.e., from the travel direction Dg of the vehicle 1. The travel direction Dg is the direction in which the vehicle 1 travels forward and backward, and is the direction directly in front of and behind the vehicle body with the steering wheel not turned to the left or right (see FIG. 1, etc.).

Figure 4:
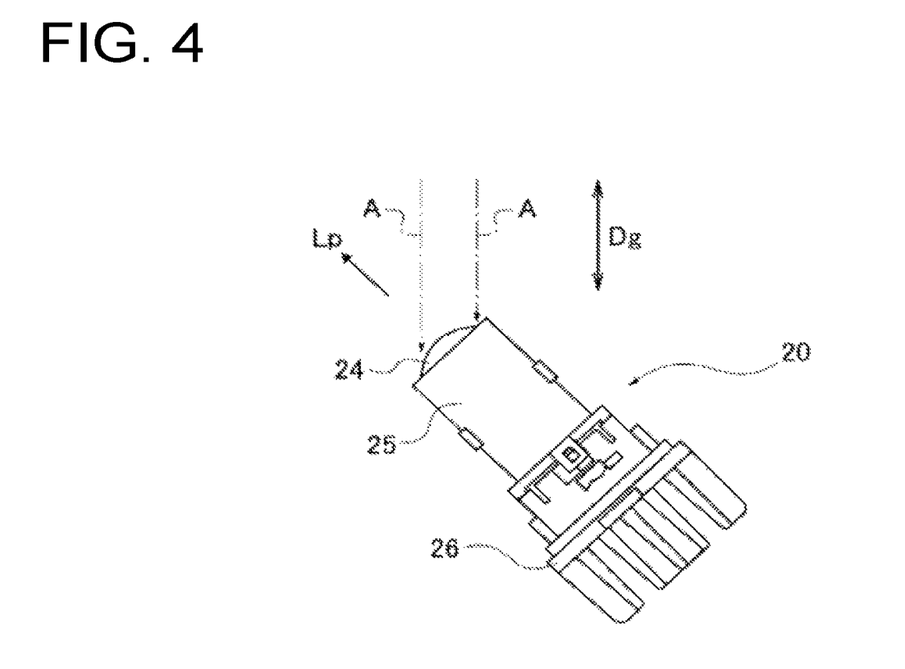
FIG. 4 is an explanatory diagram illustrating how a projection lens of the road surface irradiation unit looks from the travel direction.

The shielding part 41 is formed as follows. First, as illustrated in FIG. 4, the road surface irradiation unit 20 emits light from the projection lens 24, which is the light emitting portion for the road surface, in the optical axis direction (projection optical axis Lp), i.e., in the direction of the extension of the enclosure 25, which is cylindrical in shape with the lower member 25*a* and the upper member 25*b* fitted together. Then, the road surface irradiation unit 20 is provided in the lamp chamber 11 in a manner of being inclined with respect to the road surface 2 around the vehicle 1 while being directed to diagonal front side outside the vehicle 1, so that the optical axis direction is inclined with respect to the travel direction Dg. In this case, when the road surface irradiation unit 20 is viewed from the front, that is, when the vehicular lamp 10 is viewed from the front of the vehicle 1 in the travel direction Dg, an area sandwiched by two arrows A in the light emitting portion for the road surface (projection lens 24) is exposed, and the area appears to glow.

Figure 5:
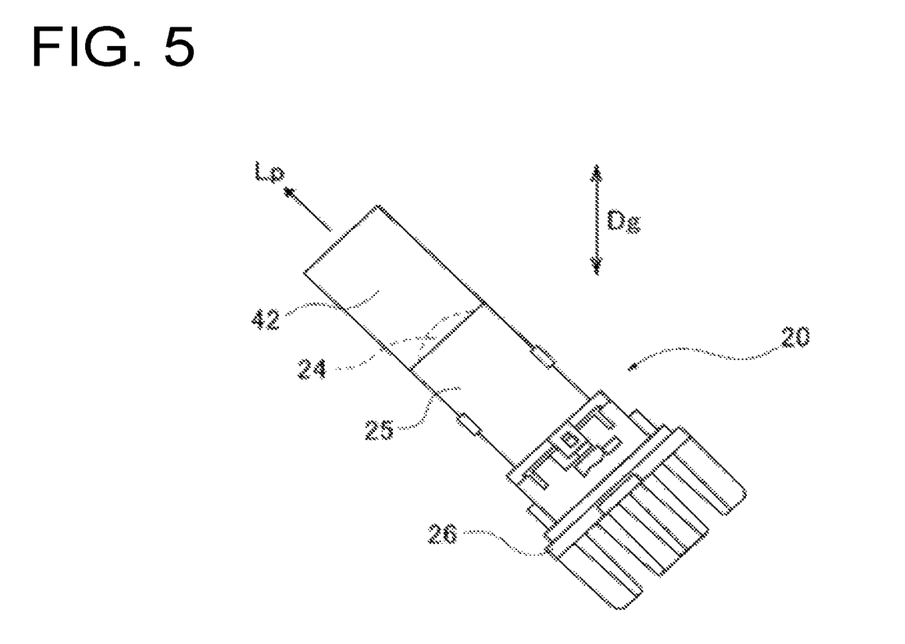
FIG. 5 is an explanatory diagram illustrating a state where the road surface irradiation unit is provided with an extension cylinder piece.

The shielding part 41 is provided to cover the light emitting portion for the road surface when viewed from the front (viewed in the travel direction Dg). Specifically, first, as illustrated in FIG. 5, the state in which the road surface irradiation unit 20 is provided in the vehicle 1 (lamp chamber 11) as described above, i.e., the state in which the unit is inclined at a predetermined angle with respect to the road surface 2 and the travel direction Dg is defined as a reference state. Then, in the road surface irradiation unit 20, an extension cylinder piece 42 extending from the enclosure 25 to the optical axis direction is provided. This extension cylinder piece 42 does not overlap with the projection lens 24 in the optical axis direction and hardly affects the projection of the irradiation pattern Pi.

Figure 6:
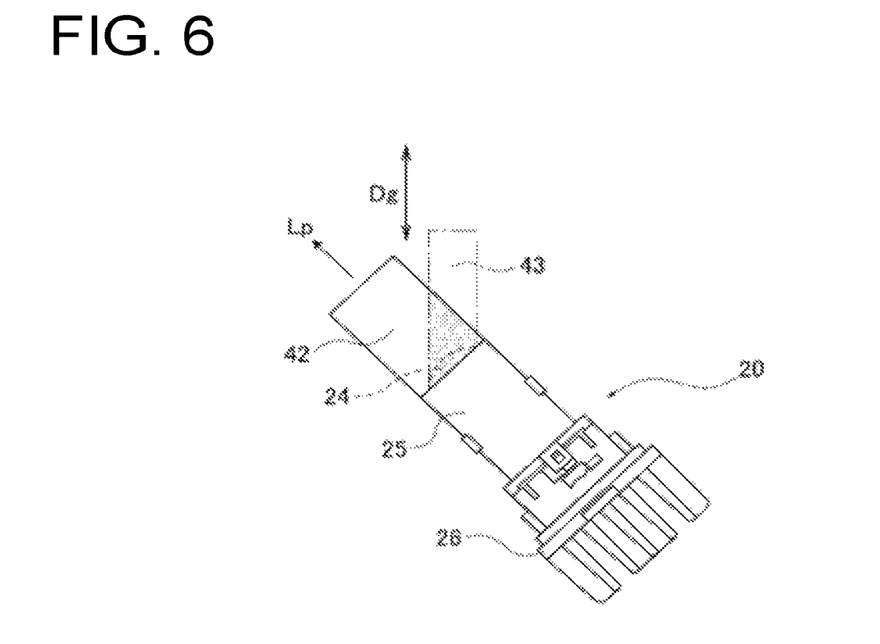
FIG. 6 is an explanatory diagram illustrating a virtual cylindrical part overlapped with the extension cylinder piece.

Next, in the road surface irradiation unit 20, a shielding area 43 is illustrated overlapped with the extension cylinder piece 42, as illustrated in FIG. 6. This shielding area 43 corresponds to the area sandwiched by the two arrows A illustrated in FIG. 4, and is the portion in the extension cylinder piece 42 that is necessary to cover up the glowing appearance when viewed from the front, and is positioned in front of the light emitting portion for the road surface (projection lens 24) in the travel direction Dg. The road surface irradiation unit 20 in the first embodiment forms an irradiation pattern Pi in the diagonal front of the vehicle 1, so that in the travel direction Dg, the front side (the forward side of the vehicle 1) is the outside with respect to the vehicular lamp 10.

Figure 7:
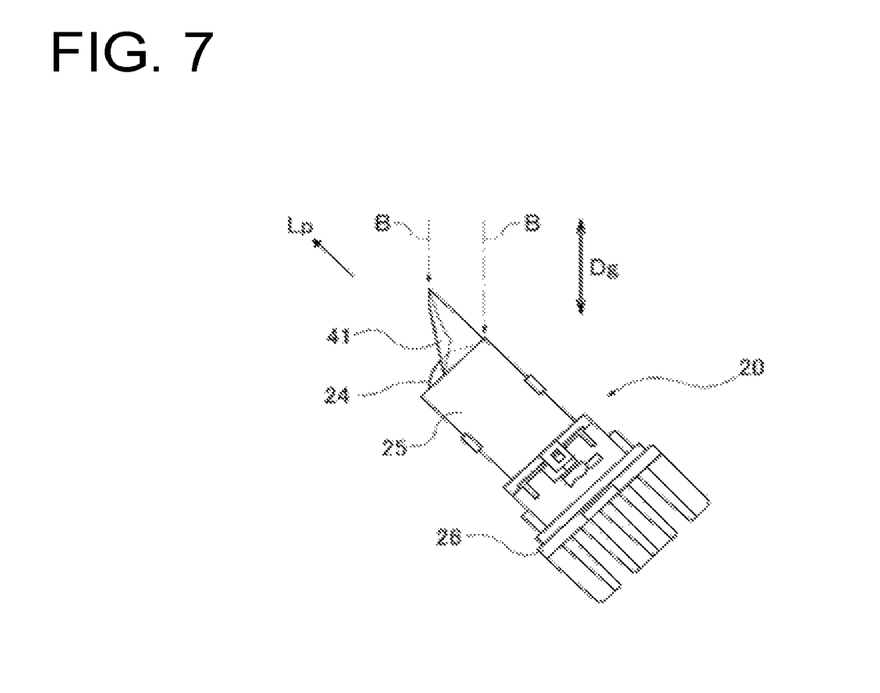
FIG. 7 is an explanatory diagram illustrating a state where the extension cylinder piece is cut off by the virtual cylindrical part to form a shielding part.

Next, as illustrated in FIG. 7, in the road surface irradiation unit 20, the portion of the extension cylinder piece 42 that overlaps with the shielding area 43 (the part hatched in FIG. 6) is the shielding part 41. Thereby, the shielding part 41 has a shape that it is shaved along the travel direction Dg while being extended from the enclosure 25 to the optical axis direction of the road surface irradiation unit 20, that is, the shielding part 41 has a shape that the extended enclosure 25 is shaved off so that a tip thereof is sharpened in the front side of the travel direction Dg and in the front side of the optical axis direction.

This shielding part 41 is formed based on the state in which it is provided in the vehicle 1 (lamp chamber 11) as described above, so that the shielding part 41 covers the projection lens 24 at a position that is in front (outside) of the projection lens 24 in the travel direction Dg in the lamp chamber 11. Thus, the shielding part 41 can prevent the projection lens 24 from being seen when the lamp chamber 11 is viewed from the front side, i.e., when viewed from the front in the travel direction Dg, as illustrated by the two arrows B.

The road surface irradiation unit 20 of the first embodiment is interlocked with the turn lamp unit 14 and, when either the right or left turn lamp unit 14 is turned on, the both light sources (31, 32) provided on the turned-on side are turned on to form the irradiation pattern Pi on the road surface 2. For example, in a situation where the vehicle 1 is coming out of an alley with poor visibility into a larger alley and is about to turn left, the left turn lamp unit 14 is flashed, and the road surface irradiation unit 20 provided in the front left forms an irradiation pattern Pi on the road surface 2. Here, the road surface irradiation unit 20 of the first embodiment forms the irradiation pattern Pi on the road surface 2 at the same time as the lighting part 14a provided on the innermost side of the turn lamp unit 14 in the vehicle width direction is turned on, the irradiation pattern Pi remains formed while each lighting part 14a is turned on and off, and the irradiation pattern Pi is turned off at the same time as the lighting part 14a provided on the outermost side of the turn lamp unit 14 is turned off. This allows drivers of surrounding vehicles to see the irradiation pattern Pi formed on the road surface 2 even when they cannot see the vehicle 1.

Here, a vehicular lamp as a comparative example (hereinafter referred to as a comparison vehicular lamp) will be described. The comparison vehicular lamp has the same configuration as the vehicular lamp 10, except that the road surface irradiation unit is not provided with a shielding part. In the comparison vehicular lamp, the projection lens of the road surface irradiation unit (the light emitting portion for the road surface) appears to glow when the lamp chamber is viewed from the front because the road surface irradiation unit is not provided with a shielding part. In addition, since the road surface irradiation unit is used to form an irradiation pattern on the road surface around the vehicle and is not intended to make the lighting of the projection lens recognizable to the surroundings, the fact that the projection lens appears to glow may degrade the design quality of the comparison vehicular lamp. This is also similar to the conventional vehicular lamps described in the prior art documents.

In particular, regarding vehicles, there is a rule that the distance between each lighting portion of the lamp that is interlockingly turned on, viewed from the front of the vehicle, i.e., from the front side of the vehicle in the travel direction Dg, or in other words, on a vertical plane perpendicular to the travel direction Dg, should be within 75 mm. Therefore, in the comparison vehicular lamp, as illustrated in FIG. 2, the projection lens of the road surface irradiation unit needs to be arranged in an area that is within 75 mm from each lighting part of the interlocking turn lamp unit (an area enclosed by the dashed line and hereinafter referred to as an arrangement area Ap). This may result in restrictions on the arrangement position of the road surface irradiation unit in comparison vehicular lamps, and the design may need to be made unreasonable due to these restrictions.

In addition, regarding vehicles, there is a rule that each lighting portion in an interlocking lamp should be turned on from the central side to the outside in the vehicle width direction, or each lighting portion in an interlocking lamp should be turned on at the same time. Therefore, in the comparison vehicular lamp, if the interlocking turn lamp unit has a sequential function, the timing of turning on the road surface irradiation unit is limited according to the arrangement position within the arrangement area Ap. In other words, when the road surface irradiation unit is provided at a center position Pc, which is more central than the turn lamp unit, the road surface irradiation unit needs to be turned on prior to the turning on of each lighting part of the turn lamp unit. Similarly, when the road surface irradiation unit is provided at a middle position Pm, which is in the middle of the turn lamp unit in the direction that the turn lamp unit is lined up, the road surface irradiation unit needs to be turned on in the middle of turning on each lighting part of the turn lamp unit, and when the road surface irradiation unit is provided at an outside position Po, which is outside of the turn lamp unit, the road surface irradiation unit needs to be turned on after all the lighting parts of the turn lamp unit have been turned on. Therefore, in the comparison vehicular lamp, the arrangement position of the road surface irradiation unit within the arrangement area Ap based on the turn lamp unit is determined according to the timing of forming the irradiation pattern, thus causing further restrictions on the arrangement position of the road surface irradiation unit. In other words, in comparison vehicular lamps, the timing of forming the irradiation pattern is determined by the arrangement position of the road surface irradiation unit relative to the turn lamp unit.

In addition, since the road surface irradiation unit has a projection lens to form the desired irradiation pattern on the road surface, it is difficult to match the size and shape of the projection lens to the lighting portion of the interlocking lamp (in this example, the lighting part of the turn lamp unit). For this reason, it is difficult to design the projection lens of comparison vehicular lamp to have a sense of unity with the lighting portions that are interlockingly turned on, and there is room for improvement in appearance.

In contrast, the vehicular lamp 10 of the first embodiment has a shielding part 41 in the road surface irradiation unit 20, which can prevent the projection lens 24, which is the light emitting portion for the road surface of the road surface irradiation unit 20, from being seen when the lamp chamber 11 is viewed from the front side in the travel direction Dg, i.e., when the road surface irradiation unit 20 is viewed from the front. Therefore, the vehicular lamp 10 can prevent the design quality from being degraded due to the fact that the glowing appearance of the projection lens 24 of the road surface irradiation unit 20 is recognized by the surroundings.

In addition, the road surface irradiation unit 20 does not need to be arranged in the arrangement area Ap, which is based on the turn lamp unit 14 that is interlockingly turned on, because the projection lens 24 is not visible, and thus the degree of freedom of the arrangement position can be increased. Therefore, the road surface irradiation unit 20 is restrained from having to make an unreasonable design due to the restriction of the arrangement position, so that the desired irradiation pattern Pi can be properly formed on the road surface 2.

Furthermore, even if the interlocking turn lamp unit 14 has a sequential function, the road surface irradiation unit 20 can be turned on at any timing regardless of the positional relationship with respect to each lighting part 14a of the turn lamp unit 14. Therefore, the arrangement position of the road surface irradiation unit 20 can be determined from the viewpoint that the irradiation pattern Pi can be properly formed, and the road surface irradiation unit 20 can form the irradiation pattern Pi at the desired timing with respect to the lighting of the turn lamp unit 14. This allows the road surface irradiation unit 20 to form the irradiation pattern Pi at any timing, regardless of the arrangement position of the unit with respect to each lighting part 14a. Therefore, even when the road surface irradiation unit 20 is provided outside of each lighting part 14a in the vehicle width direction, as in the first embodiment, the irradiation pattern Pi can be formed when each lighting part 14a starts to be turned on, and the irradiation pattern Pi can remain formed while each lighting part 14a is turned on and off, and the irradiation pattern Pi can be turned off when each lighting part 14a is turned off.

In addition, in the vehicular lamp 10, only each lighting part 14a having a design with a sense of unity in the turn lamp unit 14 is visible, which improves the appearance and allows the irradiation pattern Pi to be formed interlocking with the turn lamp unit 14.

The vehicular lamp 10 of the first embodiment can obtain each of the following operational effects.

The vehicular lamp 10 is provided with the shielding part 41 that covers the projection lens 24 as the light emitting portion for the road surface when viewed from the front in the road surface irradiation unit 20 that forms an irradiation pattern Pi around the vehicle 1. Therefore, the vehicular lamp 10 can prevent the projection lens 24 from being visible when viewed from the front regardless of the arrangement position of the road surface irradiation unit 20, and thus the degree of freedom in the arrangement of the road surface irradiation unit 20 can be improved.

In addition, in the vehicular lamp 10, the road surface irradiation unit 20 is turned on and off interlocked with a lamp unit (in the first embodiment, the turn lamp unit 14). Therefore, the road surface irradiation unit 20 can be arranged even outside of the arrangement area Ap based on the interlocking lamp unit, and the degree of freedom in the timing of turning on the light with respect to the lamp unit can be ensured.

Furthermore, in the vehicular lamp 10, the lamp unit comprises a plurality of lighting parts 14a arranged in the vehicle width direction, and each lighting part 14a is turned on in order from inside to outside of the vehicle 1. Then, the vehicular lamp 10 allows the position of the projection lens 24 in the vehicle width direction with respect to each lighting part 14a and the timing of forming the irradiation pattern Pi with the road surface irradiation unit 20 with respect to the order of turning on the plurality of lighting parts 14a in the vehicle width direction to be different. Therefore, the vehicular lamp 10 can efficiently arrange the road surface irradiation unit 20 and the lamp units, as well as the desired irradiation pattern Pi and each lighting part 14a can be turned on at any desired timing.

In the vehicular lamp 10, the projection lens 24 of the road surface irradiation unit 20 is positioned at a predetermined interval from the lamp light emitting portion of the interlocking lamp unit (in the first embodiment, each lighting part 14a of the turn lamp unit 14) on a vertical plane perpendicular to the travel direction Dg. Therefore, the vehicular lamp 10 can efficiently arrange the road surface irradiation unit 20, taking into account the arrangement of other lamps, etc., and also can properly form the desired irradiation pattern Pi on the road surface 2.

The vehicular lamp 10 has a predetermined interval for arranging the projection lens 24 relative to the lamp light emitting portion within 75 mm. Therefore, the vehicular lamp 10 can efficiently arrange the road surface irradiation unit 20 and the lamp units, as well as the desired irradiation pattern Pi and each lighting part 14a can be turned on at any desired timing.

The vehicular lamp 10 has the shielding part 41 integrated with the road surface irradiation unit 20. Therefore, the vehicular lamp 10 can has a simple configuration by just providing the road surface irradiation unit 20 at any position in the lamp chamber 11, and the projection lens 24 can be prevented from appearing to glow.

In the vehicular lamp 10, the shielding part 41 has a shape that it is shaved along the travel direction Dg while being extended from the enclosure 25 to the optical axis direction of the road surface irradiation unit 20. Thus, the vehicular lamp 10 has a simple configuration and hardly affects the projection of the irradiation pattern Pi, and can prevent the projection lens 24 from appearing to glow when viewed from the travel direction Dg.

Therefore, the vehicular lamp 10 of the first embodiment as a vehicular lamp according to the present disclosure can improve the degree of freedom in the arrangement position of the road surface irradiation unit 20.

Second Embodiment

Next, a vehicular lamp 10A of a second embodiment as an embodiment of the present disclosure will be described by using FIG. 8. The vehicular lamp 10A comprises a road surface irradiation unit 20A alone in a lamp chamber 11A. The road surface irradiation unit 20A is similar in basic concept and configuration to the road surface irradiation unit 20 used in the vehicular lamp 10 of the first embodiment, except that a shielding part 41A is provided as a separate body. Therefore, the same symbols are attached to the parts with the same configuration, and detailed explanations are omitted.

Figure 8:
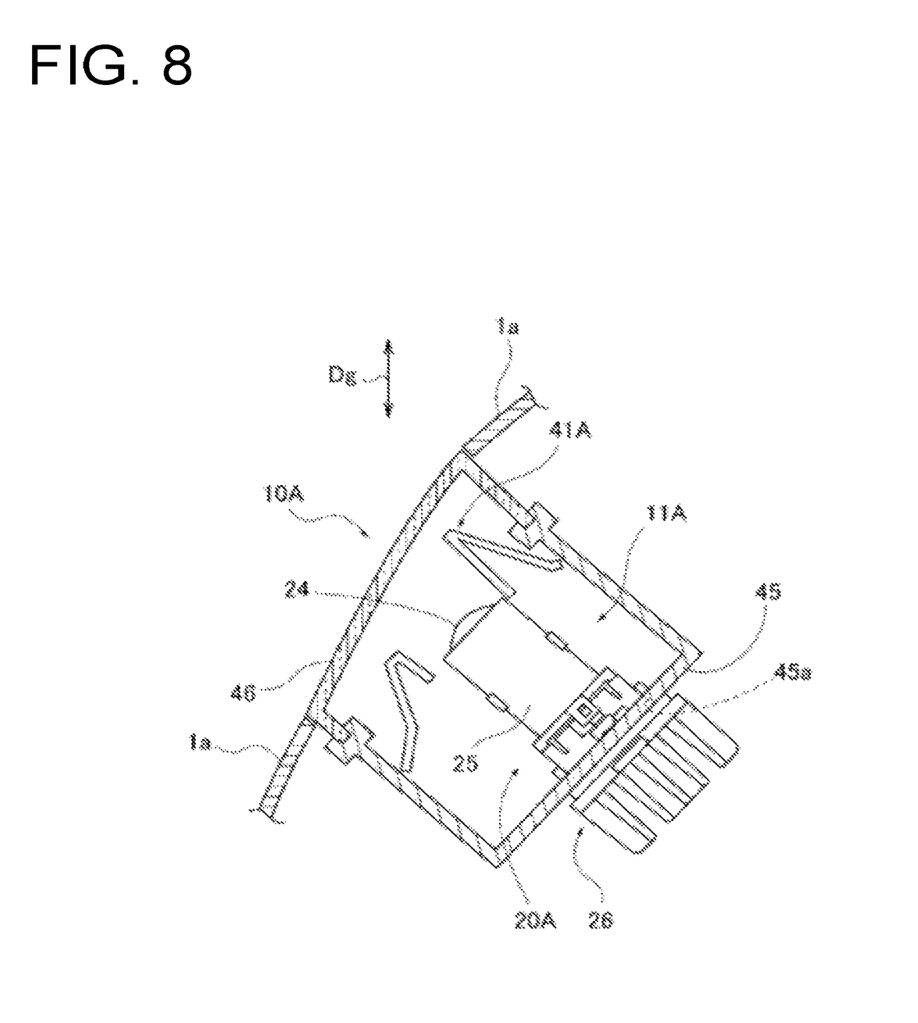
FIG. 8 is a diagram illustrating a vehicular lamp of a second embodiment.

As illustrated in FIG. 8, the vehicular lamp 10A of the second embodiment is provided with the road surface irradiation unit 20A in the lamp chamber 11A. The lamp chamber 11A comprises a lamp housing 45, which is open at one end, and an outer lens 46, which is provided to seal the open end. The inner wall of the lamp housing 45 is provided with a reflective film or the like as appropriate, and a mounting hole 45a for mounting the road surface irradiation unit 20A. In the vehicular lamp 10A, the outer lens 46 is formed substantially flush with a part of the vehicle body (vehicle body component 1a).

The road surface irradiation unit 20A has the same configuration as the road surface irradiation unit 20 of the first embodiment, except that the shielding part 41 is not provided. In this vehicular lamp 10A, a shielding part 41A is provided in the lamp chamber 11A. This shielding part 41A is composed of an inner panel in the lamp chamber 11A. The shielding part 41A is provided, with respect to the road surface irradiation unit 20A in the state of being provided in the lamp chamber 11A, to cover a projection lens 24 as a light emitting portion for a road surface when viewed from the front, i.e., when viewed in a travel direction Dg. The shielding part 41A is provided in a lamp housing 45 based on the mounting hole 45a, so that when the road surface irradiation unit 20A is mounted in the mounting hole 45a of the lamp housing 45, the shielding part 41A is in a positional relationship that covers the projection lens 24 as viewed from the outside in the travel direction Dg.

In this vehicular lamp 10A, when both light sources (31, 32) are turned on, the light from the both light sources (31, 32) is emitted from projection lens 24 via the condenser lenses 22 and the filter 23 to form an irradiation pattern Pi at a desired position on the road surface 2. In this case, in the vehicular lamp 10A, the projection lens 24 (light emitting portion for road surface) glows, but the projection lens 24 is covered by the shielding part 41A when viewed from the front, which prevents the projection lens 24 from appearing to glow even when the lamp chamber 11A is viewed from the outside in the travel direction Dg.

The vehicular lamp 10A according to the second embodiment can obtain each of the following operational effects. As the vehicular lamp 10A basically has the same configuration as that of the vehicular lamp 10 according to the first embodiment, the same effect as that in the first embodiment may be obtained.

In addition, the vehicular lamp 10A has a shielding part 41A that is provided separately from the road surface irradiation unit 20A. Therefore, in the vehicular lamp 10A, it is easy to provide the shielding part 41A to be in an appropriate positional relationship with respect to the projection lens 24 of the road surface irradiation unit 20A.

Furthermore, in the vehicular lamp 10A, the position and size of the shielding part 41A can be set appropriately according to the inclination of the optical axis direction of the road surface irradiation unit 20A with respect to the road surface 2 around the vehicle 1. Therefore, even if the mounting position on the vehicle 1 or the position where the irradiation pattern Pi is formed around the vehicle 1 is changed, the vehicular lamp 10A can easily accommodate such changes and cover the projection lens 24 when viewed from the front, while using the road surface irradiation unit 20A having the same configuration.

Therefore, the vehicular lamp 10A of the second embodiment as a vehicular lamp according to the present disclosure can improve the degree of freedom in the arrangement position of the road surface irradiation unit 20A.

In addition, in the vehicular lamp 10A of the second embodiment, the lamp chamber 11A is only provided with the road surface irradiation unit 20A. However, in the vehicular lamp 10A, together with the road surface irradiation unit 20A, at least one of the turn lamp unit 14, the low beam unit 12, the high beam unit 13 of the first embodiment and other lamp units may also be provided, and the vehicular lamp 10A is not limited to the configuration of the second embodiment. In this case, the road surface irradiation unit 20A may be turned on and off interlocked with any one of the lamp units. Even in this case, the vehicular lamp 10A can cover the projection lens 24 of the road surface irradiation unit 20A when viewed from the front with the shielding part 41A, so that the irradiation pattern Pi can be formed at the desired timing.

The vehicular lamp according to the present disclosure has been described above based on each embodiment, but specific configurations are not limited to each embodiment, and design modifications, additions, and the like, are allowable without departing from the gist of the invention according to the claims in the scope of claims.

Further, in each embodiment, the irradiation pattern Pi is constituted by aligning three irradiation drawing patterns Di at substantially equal intervals in the direction away from the vehicle 1. However, provided that the irradiation pattern is formed on the road surface 2 around the vehicle 1 and informs any person around the vehicle 1 of some intention of the driver, the pattern, position to be formed and the like may be anything as long as being set as appropriate and is not limited to the configuration of each embodiment. In addition, although the road surface irradiation unit 20 is interlocked with a turn lamp in the first embodiment, it may be interlocked with other lamps, such as a backup light, or may be operated individually, and is not limited to the configuration of the first embodiment. In this case, the timing of forming the irradiation pattern (including the length of time to continue turn-on) with respect to the timing of turning on other lamps may also be set appropriately, and is not limited to the configuration of the first embodiment. Then, as long as the vehicular lamp is provided on the vehicle 1 according to the position of the irradiation pattern to the vehicle 1, it may be housed in the door mirror, placed in the lamp chamber 11 of the backup light or the tail light (lamp chambers 11 on left and right sides at the rear of the vehicle), or provided in the body of the vehicle, and is not limited to the configuration of each embodiment.

In addition, in the first embodiment, the shielding part 41 illustrated in FIG. 7, etc., is integrally provided with the road surface irradiation unit 20, and in the second embodiment, the shielding part 41A illustrated in FIG. 8 is provided in the lamp housing 45 as a separate body from the road surface irradiation unit 20A. However, the location, shape, size, etc. of the shielding part can be set as appropriate, and is not limited to the configuration of each embodiment, as long as it covers the light emitting portion for the road surface (projection lens 24 in each embodiment) when the lamp chamber is viewed from the front, i.e., when the lamp chamber is viewed from the outside in the travel direction. For example, the shielding part may protrude from other portions of the road surface irradiation unit, may be formed of other members in the lamp chamber, may be formed of other lamp units in the lamp chamber, may be formed by coloring a part of the outer lens, or may utilize a part of the vehicle body such as the bumper or grille.

Furthermore, in each embodiment, the road surface irradiation units 20 and 20A are formed by housing a light source part 21, a condenser lens 22, a filter 23, and a projection lens 24 in an enclosure 25. However, the road surface irradiation unit is not limited to the configuration of each embodiment, as long as it forms an irradiation pattern Pi around the vehicle 1 with the light from the light emitting portion for the road surface. For example, the road surface irradiation unit may form an irradiation pattern by shaping the light from the light source with lenses without using filters. In this configuration, the outermost lens is the light emitting portion for the road surface. In addition, the road surface irradiation unit may also be a so-called reflector system, in which the light from the light source is reflected toward the road surface while being shaped by a reflector to form an irradiation pattern Pi. In this configuration, the reflector becomes the light emitting portion for the road surface. In any case, the same effect as in each embodiment can be obtained by providing a shielding part to cover the light emitting portion for the road surface when viewed from the front, i.e., when the lamp chamber is viewed from the outside in the travel direction.

In each embodiment, the filter 23 that allows the light condensed by the condenser lens 22 to transmit through the irradiation slit 36 is used as the light shielding member. However, the light shielding member may be of any other configuration as long as it is provided with the irradiation slit 36 that partially transmits the light condensed by the condenser lens 22, and is not limited to the configuration of each embodiment. As an exemplary other configuration, such a light shielding plate may be used, which is made of a plate-like film member that blocks the transmission of light, and has an irradiation slit allowing light that has transmitted through the condenser lens 22 to partially transmit through the irradiation slit.

In each embodiment, vehicular lamps 10 and 10A are provided in a vehicle 1 driven by a driver. However, vehicular lamps may be provided in vehicles with automatic driving functions and are not limited to the configuration of each embodiment. In this case, the vehicular lamp is not limited to the configuration of each embodiment, as long as the irradiation pattern is formed at a timing appropriate to the application for which it is provided, i.e., at a timing according to some intention regarding the operation of the vehicle 1.

In each embodiment, in the road surface irradiation units 20 and 20A, the light source part 21 is provided on the installation base part 26 that functions as a heat sink (heat dissipation portion 26b), and this installation base part 26 is connected to the enclosure 25. However, the road surface irradiation unit is not limited to the configuration of each embodiment, and as long as the irradiation pattern is formed by the light from the light source, the light source may be located at an end of the enclosure or may have any other configuration.

DESCRIPTION OF REFERENCE NUMERALS

10, 10A vehicular lamp
1 vehicle
11 lamp chamber
14 turn lamp unit (as an example of a lamp unit)
20 road surface irradiation unit
24 projection lens (as an example of a light emitting portion for a road surface)
25 enclosure
31, 32 light source
41, 41A shielding part
42 extension cylinder piece
43 virtual cylindrical part
Dg travel direction
Pi, PiA irradiation pattern

The invention claimed is:

1. A vehicular lamp, comprising:
a road surface irradiation unit that forms an irradiation drawing pattern and emits the formed irradiation pattern around a vehicle, the road surface irradiation unit including a light emitting portion for a road surface, which emits the formed irradiation drawing pattern around the vehicle;
a shielding part covering the light emitting portion for the road surface when the road surface irradiation unit is viewed from the front; and
a lamp unit housed in a lamp chamber together with the road surface irradiation unit,
wherein the road surface irradiation unit is turned on and off interlocked with the lamp unit, and
wherein the lamp unit comprises a plurality of lighting parts arranged in a vehicle width direction, and the plurality of lighting parts are turned on in order from inside to outside of the vehicle,
and the road surface irradiation unit makes positions of the light emitting portions for the road surface in the vehicle width direction with respect to the plurality of lighting parts and timings of forming the irradiation drawing pattern with respect to the order of turning on the plurality of lighting parts in the vehicle width direction to be different.

2. The vehicular lamp according to the claim 1, wherein the road surface irradiation unit has the light emitting portion for the road surface positioned at a predetermined interval from the lamp light emitting portion of the interlocking lamp unit on a vertical plane perpendicular to a travel direction of the vehicle.

3. The vehicular lamp according to the claim 1, wherein the shielding part is provided separately from the road surface irradiation unit.

4. The vehicular lamp according to the claim 1, wherein the shielding part is integrally provided with the road surface irradiation unit.

5. A vehicular lamp, comprising:
a road surface irradiation unit that forms an irradiation drawing pattern and emits the formed irradiation pattern around a vehicle, the road surface irradiation unit including a light emitting portion for a road surface, which emits the formed irradiation drawing pattern around the vehicle;
a shielding part covering the light emitting portion for the road surface when the road surface irradiation unit is viewed from the front; and
a lamp unit housed in a lamp chamber together with the road surface irradiation unit,
wherein the road surface irradiation unit is turned on and off interlocked with the lamp unit, and
wherein the lamp unit comprises a plurality of lighting parts arranged in a vehicle width direction, and the plurality of lighting parts are turned on in order from inside to outside of the vehicle, and the road surface irradiation unit is arranged on an outer side of the vehicle in the vehicle width direction than the lighting part positioned innermost of the vehicle, and forms the irradiation pattern at the same time as turning on the lighting part positioned innermost of the vehicle.

6. The vehicular lamp according to the claim 5, wherein the road surface irradiation unit has the light emitting portion for the road surface positioned at a predetermined interval from the lamp light emitting portion of the interlocking lamp unit on a vertical plane perpendicular to a travel direction of the vehicle.

7. The vehicular lamp according to the claim 5, wherein the shielding part is provided separately from the road surface irradiation unit.

8. The vehicular lamp according to the claim 5, wherein the shielding part is integrally provided with the road surface irradiation unit.

9. A vehicular lamp, comprising:
a road surface irradiation unit that forms an irradiation drawing pattern and emits the formed irradiation pattern around a vehicle, the road surface irradiation unit including a light emitting portion for a road surface, which emits the formed irradiation drawing pattern around the vehicle; and
a shielding part covering the light emitting portion for the road surface when the road surface irradiation unit is viewed from the front,
wherein the shielding part is integrally provided with the road surface irradiation unit, and
wherein the road surface irradiation unit has a light source, a projection lens that projects light from the light source to become the light emitting portion for the road surface, and a cylindrical enclosure that supports the light source and the projection lens,
and the shielding part has a shape shaved along the travel direction of the vehicle while being extended from the enclosure to an optical axis direction of the road surface irradiation unit.

10. A vehicular lamp, comprising:
a road surface irradiation unit for forming an irradiation pattern around a vehicle with light from a light emitting portion for a road surface;
a shielding part covering the light emitting portion for the road surface when the road surface irradiation unit is viewed from the front; and
a lamp unit housed in a lamp chamber together with the road surface irradiation unit,
wherein the road surface irradiation unit is turned on and off interlocked with the lamp unit,
wherein the lamp unit comprises a plurality of lighting parts arranged in a vehicle width direction, and the plurality of lighting parts are turned on in order from inside to outside of the vehicle, and
wherein the road surface irradiation unit is arranged on an outer side of the vehicle in the vehicle width direction than the lighting part positioned innermost of the vehicle, and forms the irradiation pattern at the same time as turning on the lighting part positioned innermost of the vehicle.

* * * * *